(12) United States Patent
Kim et al.

(10) Patent No.: US 11,845,361 B2
(45) Date of Patent: Dec. 19, 2023

(54) ELECTRIC VEHICLE INCLUDING RANKINE CYCLE

(71) Applicant: KOREA INSTITUTE OF INDUSTRIAL TECHNOLOGY, Cheonan-si (KR)

(72) Inventors: Young Won Kim, Gwangju (KR); Jung Bo Sim, Gwangju (KR); Jin Young Son, Gwangju (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 0 days.

(21) Appl. No.: 17/254,857

(22) PCT Filed: Nov. 8, 2019

(86) PCT No.: PCT/KR2019/015173
§ 371 (c)(1),
(2) Date: Dec. 22, 2020

(87) PCT Pub. No.: WO2021/090988
PCT Pub. Date: May 14, 2021

(65) Prior Publication Data
US 2022/0314815 A1    Oct. 6, 2022

(30) Foreign Application Priority Data
Nov. 8, 2019   (KR) .................. 10-2019-0142442

(51) Int. Cl.
*F01K 13/00*   (2006.01)
*B60L 8/00*    (2006.01)
*F01K 13/02*   (2006.01)

(52) U.S. Cl.
CPC ............ *B60L 8/003* (2013.01); *F01K 13/003* (2013.01); *F01K 13/02* (2013.01); *B60L 2270/46* (2013.01)

(58) Field of Classification Search
CPC ................. B60L 8/003; B60L 2270/46; B60L 2240/662; B60L 58/26; B60L 2240/425;
(Continued)

(56) References Cited

U.S. PATENT DOCUMENTS 6,996,988 B1   2/2006 Bussard
2003/0047207 A1*  3/2003 Aylaian ............... H01L 31/0547
257/E25.007

(Continued)

FOREIGN PATENT DOCUMENTS

JP   2006349211 A   12/2006
JP   2009121390 A    6/2009
(Continued)

OTHER PUBLICATIONS

International Search Report dated Aug. 3, 2020 for PCT/KR2019/015173, citing the above reference(s).

*Primary Examiner* — Matthew T Largi
(74) *Attorney, Agent, or Firm* — CANTOR COLBURN LLP

(57) ABSTRACT

An electric vehicle including the Rankine cycle in which a circulation system of working fluid is formed is proposed. The Rankine cycle includes a pump configured to circulate the working fluid along the circulation system, a heat source comprising a battery unit, a motor unit, and a solar panel unit to transmit thermal energy to the working fluid circulated by the pump, a power generating unit provided on a path of the circulation system to generate electric energy through the thermal energy of the working fluid passing through the heat source, and a radiator configured to perform a heat exchange process between the working fluid passing through the (Continued)

power generating unit and outside air. The Rankine cycle further includes a flow distributor to distribute the working fluid circulated by the pump to at least any one of the battery unit, the motor unit, and the solar panel unit.

14 Claims, 7 Drawing Sheets

(58) Field of Classification Search
CPC .. B60L 2240/545; F01K 13/003; F01K 13/02; F01K 15/02; F01K 27/02; F01P 5/02; H02S 10/00; H02S 40/42; B60W 40/105; F01D 15/10; F16C 32/06
See application file for complete search history.

(56) References Cited

U.S. PATENT DOCUMENTS

| | | | |
|---|---|---|---|
| 2006/0225421 A1* | 10/2006 | Yamanaka | F02G 5/00 60/645 |
| 2011/0247783 A1* | 10/2011 | Yu | B60H 1/00499 165/47 |
| 2012/0003516 A1* | 1/2012 | Eisenhour | H01M 10/625 429/62 |
| 2013/0186087 A1* | 7/2013 | Gibble | F01K 13/02 60/618 |
| 2017/0077572 A1* | 3/2017 | Parkinson | H01G 9/20 |
| 2017/0138302 A1* | 5/2017 | Leon-Rovira | F01K 11/02 |
| 2019/0351739 A1* | 11/2019 | Kim | B60H 1/32281 |
| 2020/0292240 A1* | 9/2020 | Chase | F01K 17/02 |
| 2021/0129699 A1* | 5/2021 | Luoma | B60L 53/52 |
| 2022/0399783 A1* | 12/2022 | Lang | F02B 63/041 |

FOREIGN PATENT DOCUMENTS

| | | |
|---|---|---|
| JP | 2009264353 A | 11/2009 |
| JP | 2014108676 A | 6/2014 |
| JP | 201534497 A | 2/2015 |
| JP | 201661199 A | 4/2016 |
| JP | 2016162527 A | 9/2016 |
| KR | 1020180078075 A | 7/2018 |
| RU | 2605703 C2 * | 12/2016 |
| WO | 2014112326 A1 | 7/2014 |

\* cited by examiner

ELECTRIC VEHICLE INCLUDING RANKINE CYCLE

TECHNICAL FIELD

The present disclosure relates to an electric vehicle including the Rankine cycle. More particularly, the disclosure relates to an electric vehicle including the Rankine cycle, capable of obtaining additional energy by determining the distribution flow rate of working fluid through a flow distributor, and circulating through the Rankine cycle using generated waste heat, from a heat source including at least any one of a battery unit, a motor unit, and a solar panel unit.

BACKGROUND ART

An electric vehicle is a vehicle that is moved by rolling wheels with a motor, and is distinguished from an ordinary vehicle that is moved by exploding a mixture of fossil fuel such as gasoline, diesel, or natural gas and air in an internal combustion engine to operate a piston.

The electric vehicle is classified into an electric car that may travel at high speeds over a long distance on a highway, and a neighborhood electric vehicle that may travel at low speeds mainly in a city. Electricity which is a power source of the motor may be obtained from a solar cell or a charged storage battery.

Generally, while the electric vehicle is running, heat is generated from a battery, a motor or the like. However, the thermal energy is often lost as waste heat. Consequently, in the related art, energy for driving each part of the electric vehicle is wholly supplied by electric energy produced from the battery. This causes an increase in power consumption of the battery as well as a significant reduction in lifespan of the battery.

Therefore, there is a need for a method to solve these problems.

DISCLOSURE

Technical Problem

Accordingly, the present disclosure has been made keeping in mind the above problems occurring in the related art, and is intended to provide an electric vehicle including the Rankine cycle, in which the Rankine cycle is formed using a heat source provided in an electric vehicle, thus producing additional energy using waste heat that is generated from a heat source.

The objects of the present disclosure are not limited to the above-mentioned objects, and other objects which are not mentioned above will be clearly understood by those skilled in the art from the following description.

Technical Solution

In order to accomplish the above-described object, the present disclosure provides an electric vehicle including the Rankine cycle in which a circulation system of working fluid is formed, wherein the Rankine cycle may include a pump configured to circulate the working fluid along the circulation system; a heat source including a battery unit, a motor unit, and a solar panel unit to transmit thermal energy to the working fluid circulated by the pump; a power generating unit provided on a path of the circulation system to generate electric energy through the thermal energy of the working fluid passing through the heat source; and a radiator configured to perform a heat exchange process between the working fluid passing through the power generating unit and outside air, and the Rankine cycle may further include a flow distributor to distribute the working fluid circulated by the pump to at least any one of the battery unit, the motor unit, and the solar panel unit.

The heat source may be provided on a path of the circulation system to directly perform the heat exchange process with the working fluid.

The electric vehicle may further include a heat exchange unit provided on the path of the circulation system to be spaced apart from the heat source, and indirectly performing the heat exchange process between heat generated from the heat source and the working fluid.

The electric vehicle may further include a controller configured to control driving of the Rankine cycle.

The electric vehicle may further include an acceleration sensor configured to sense a speed of the vehicle, and the controller may control a circulating flow rate of the working fluid to correspond to the speed of the vehicle determined by the acceleration sensor.

The electric vehicle may further include a cooling fan configured to produce air having a predetermined speed and supply the air to the radiator, when it is determined by the acceleration sensor that the speed of the vehicle is less than a reference speed.

The electric vehicle may further include a temperature sensor configured to sense temperature of heat transferred from the solar panel unit, and the controller may control the circulating flow rate of the working fluid to correspond to the temperature of the heat transferred from the solar panel unit and determined by the temperature sensor.

The battery unit may include a battery body; an inner housing provided to surround the battery body; and an outer housing provided to surround the inner housing, having on a first side thereof a first inlet into which the working fluid is introduced, and having on a second side thereof a first outlet from which the working fluid is discharged, with a first heat exchange path defined between the outer housing and the inner housing to allow the working fluid to flow therethrough.

The battery unit may further include a radiation fin exposed to the first heat exchange path.

The motor unit may include a rotor and a stator; and a case formed to surround the rotor and the stator, having on a first side thereof a second inlet into which the working fluid is introduced, having on a second side thereof a second outlet from which the working fluid is discharged, and having a second heat exchange path to cause the second inlet and the second outlet to communicate with each other.

The solar panel unit may include a solar panel configured to collect solar light; and a cooling module including a third inlet into which the working fluid is introduced, a third outlet from which the working fluid is discharged, a third heat exchange path which causes the third inlet and the third outlet to communicate with each other to circulate the working fluid, and a heat exchange plate provided to come into contact with a surface of the solar panel.

The working fluid may be phase-changed from liquid to gas while passing through the heat source.

The power generating unit may include a turbine rotated by flow of the working fluid that is phase-changed to the gaseous state; a rotating shaft connected to the turbine to be rotated by rotation of the turbine; a gas bearing formed to surround a part of the rotating shaft, and including an inner race rotated as the rotating shaft is rotated, and an outer race formed to surround the inner race; a cover module formed to surround the gas bearing, and selectively moving away from or coming into contact with the gas bearing; and a rolling bearing provided between the inner race and the outer race, and rotated between the inner race and the outer race to reduce friction force before the cover module comes into contact with the rotating shaft.

The cover module may be spaced apart from the gas bearing by a predetermined distance as the working fluid is supplied at a preset pressure level or more, thus maintaining a state independent from rotation of the gas bearing.

The rolling bearing may be rotated between the inner race and the outer race to reduce the friction force, when the cover module comes into contact with the gas bearing as the working fluid is supplied below the preset pressure level.

In order to accomplish the above-described object, the present disclosure provides an electric vehicle including the Rankine cycle in which a circulation system of working fluid is formed, wherein the Rankine cycle may include a pump configured to circulate the working fluid along the circulation system; a heat source including a battery unit, a motor unit, and a solar panel unit to transmit thermal energy to the working fluid circulated by the pump; a power generating unit provided on a path of the circulation system to generate electric energy through the thermal energy of the working fluid passing through the heat source; and a condenser configured to perform a heat exchange process between the working fluid passing through the power generating unit and outside air, and the Rankine cycle may further include a flow distributor to distribute the working fluid circulated by the pump to at least any one of the battery unit, the motor unit, and the solar panel unit.

The heat source may be provided on a path of the circulation system to directly perform the heat exchange process with the working fluid.

The electric vehicle may further include a heat exchange unit provided on the path of the circulation system to be spaced apart from the heat source, and indirectly performing the heat exchange process between heat generated from the heat source and the working fluid.

The electric vehicle may further include a controller configured to control driving of the Rankine cycle.

The working fluid may be phase-changed from liquid to gas while passing through the heat source.

Advantageous Effects

An electric vehicle including the Rankine cycle according to the present disclosure is advantageous in that additional energy can be obtained by circulating through the Rankine cycle using waste heat produced from a heat source, i.e. at least any one of a battery unit, a motor unit, and a solar panel unit, so that the additional energy can be supplied to various parts of the electric vehicle, thus increasing the usage time of a battery itself, and increasing the lifespan of the battery.

It is to be understood that the effects of the present disclosure are not limited to the above-mentioned effects, and other effects deducible from the configuration of the disclosure described in the detailed description or the claims are included.

BEST MODE

Figure 1:
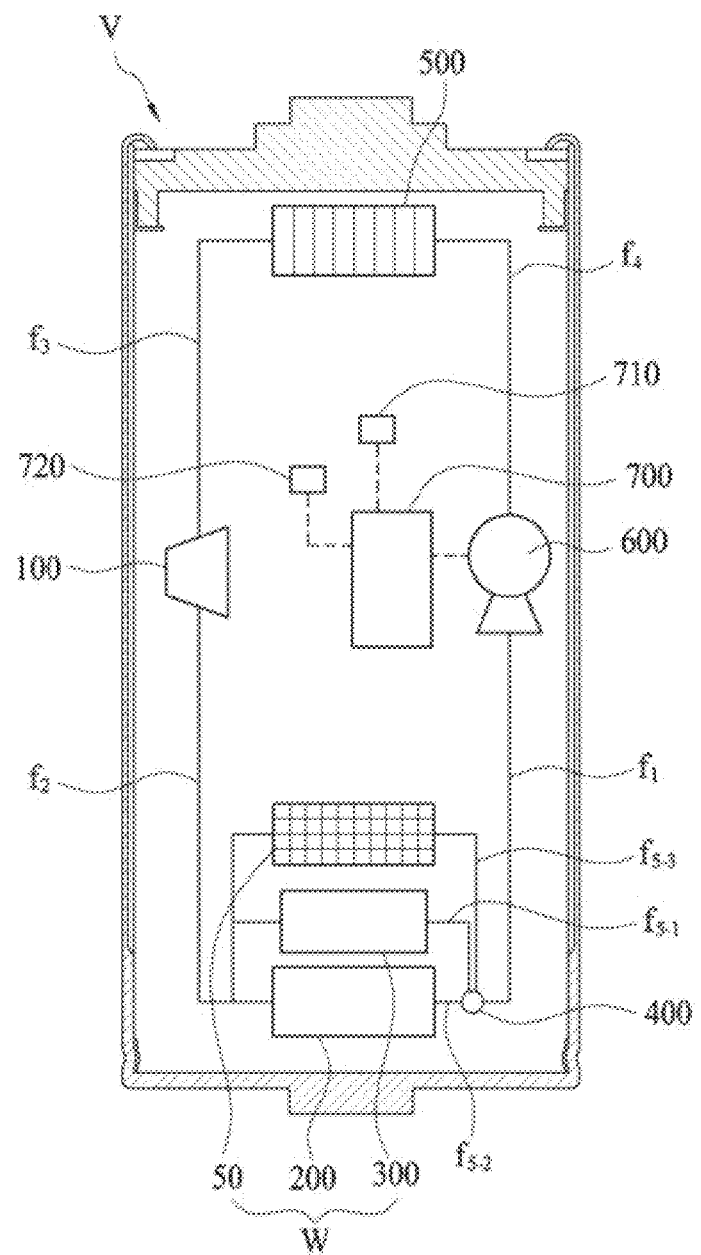
FIG. 1 is a diagram schematically illustrating the structure of an electric vehicle in accordance with an embodiment of the present disclosure.

The present disclosure will be described in detail with reference to particular embodiments shown in the accompanying drawings. Like reference numerals denote like components throughout the drawings.

FIG. 1 is a diagram schematically illustrating the structure of an electric vehicle V in accordance with an embodiment of the present disclosure.

As shown in FIG. 1, the electric vehicle V in accordance with the embodiment of the present disclosure includes the Rankine cycle in which a circulation system of working fluid is formed. Thus, the present disclosure may obtain additional energy by circulating through the Rankine cycle using waste heat produced from a heat source of the electric vehicle V, and may supply the additional energy to various parts of the electric vehicle.

To be more specific, the Rankine cycle in the embodiment of the present disclosure includes a pump 600, a heat source W including at least any one of a battery unit 200, a motor unit 300, and a solar panel unit 50, a power generating unit 100, and a radiator 500.

The pump 600 is a component for circulating working fluid along the circulation system of the Rankine cycle, and circulates the working fluid through a first circulation line f1 towards the heat source W.

The heat source W may include at least any one of the battery unit 200, the motor unit 300, and the solar panel unit 50, which transmit thermal energy to the working fluid circulated by the pump 600. Here, the motor unit 300 serves to rotate a driving wheel of the electric vehicle V, and the battery unit 200 serves to supply electric energy to the motor unit 300 and each part of the electric vehicle V. The solar panel unit 50 may include one or more solar panels provided to be exposed to the outside of the electric vehicle V, and the solar panel generates electric energy through solar light. Meanwhile, since the solar panel is heated by solar heat, the present disclosure may use it as the heat source W.

In this embodiment, the heat source W includes all of the battery unit 200, the motor unit 300, and the solar panel unit 50. In this case, the Rankine cycle may further include a flow distributor 400 to distribute the working fluid circulated by the pump 600 to at least one of the battery unit 200, the motor unit 300, and the solar panel unit 50.

In other words, the working fluid circulated through a first circulation line f1 may be distributed to at least any one of a first branch line f5-1, a second branch line f5-2, and a third branch line f5-3 by the flow distributor 400, thus allowing a predetermined flow rate to flow. This may be determined in proportion to the temperature of heat generated from the battery unit 200, the motor unit 300, and the solar panel unit 50.

Particularly, in this embodiment, the heat source W is provided on a path of the circulation system to directly perform a heat exchange process with the working fluid. Thus, while the working fluid passes through the heat source W, temperature may be increased, and the battery unit 200 and the motor unit 300 may be cooled.

Furthermore, in this embodiment, temperature and pressure may be controlled such that a phase is changed from liquid to gas while the working fluid passes through the heat source. This allows a subsequent electric-energy producing process to be easily performed through gaseous working fluid.

The working fluid passing through the heat source W is circulated through a second circulation line f2 to the power generating unit 100.

The power generating unit 100 is provided on the path of the circulation system to serve to generate electric energy through the thermal energy of the working fluid passing through the heat source W.

The additional energy generated by the power generating unit 100 may be supplied to various parts of the electric vehicle. Thus, the electric vehicle V of the present disclosure is advantageous in that the usage time of a battery itself can be increased and the lifespan of the battery can also be increased. A detailed structure of the power generating unit 100 will be described below.

The electric energy generated by the power generating unit 100 may be accumulated in an energy storage system (ESS) provided in the vehicle, and may be subsequently supplied to each part of the vehicle requiring the electric energy.

Then, the working fluid passing through the power generating unit 100 passes through the radiator 500 via a third circulation line f3. The radiator 500 performs a heat exchange process between the working fluid passing through the power generating unit 100 and the outside air, and the working fluid that has been subjected to the heat exchange process flows through a fourth circulation line f4 to the pump 600, thus forming one cycle.

The electric vehicle V of the present disclosure may have a grill, which is not provided in a general electric vehicle V, so as to perform the heat exchange process between the working fluid and the outside air through the radiator 500.

Meanwhile, the electric vehicle V of this embodiment may further include a controller 700 that controls the driving of the Rankine cycle, an acceleration sensor 710 that senses the speed of the vehicle, and a temperature sensor 720 that senses the temperature of heat transferred from the solar panel unit 50.

Such a controller 700 may control the circulating flow rate of the working fluid to correspond to the speed of the vehicle determined by the acceleration sensor 710. In other words, this embodiment is intended to control the circulation volume of the working fluid in consideration of a heat exchange volume between the working fluid and the outside air in the radiator 500 according to the speed of the vehicle.

For example, the controller 700 may control to prevent the circulation of the working fluid when it is determined that the speed of the vehicle is less than a reference speed, and may control to allow the circulation of the working fluid when it is determined that the speed of the vehicle is equal to or more than the reference speed.

On the other hand, in order to employ the Rankine cycle by circulating the working fluid even when it is determined that the speed of the vehicle is less than the reference speed, this embodiment may further include a cooling fan (not shown) that produces air having a predetermined speed and supplies the air to the radiator 500.

Furthermore, the controller 700 may control the circulating flow rate of the working fluid to correspond to the temperature of heat transferred from the solar panel unit 50 determined by the temperature sensor 720. In other words, this embodiment is intended to control the circulation volume of the working fluid in consideration of the heat exchange volume between the working fluid and the outside air in the radiator 500 according to the speed of the solar panel unit 50.

Figure 2:
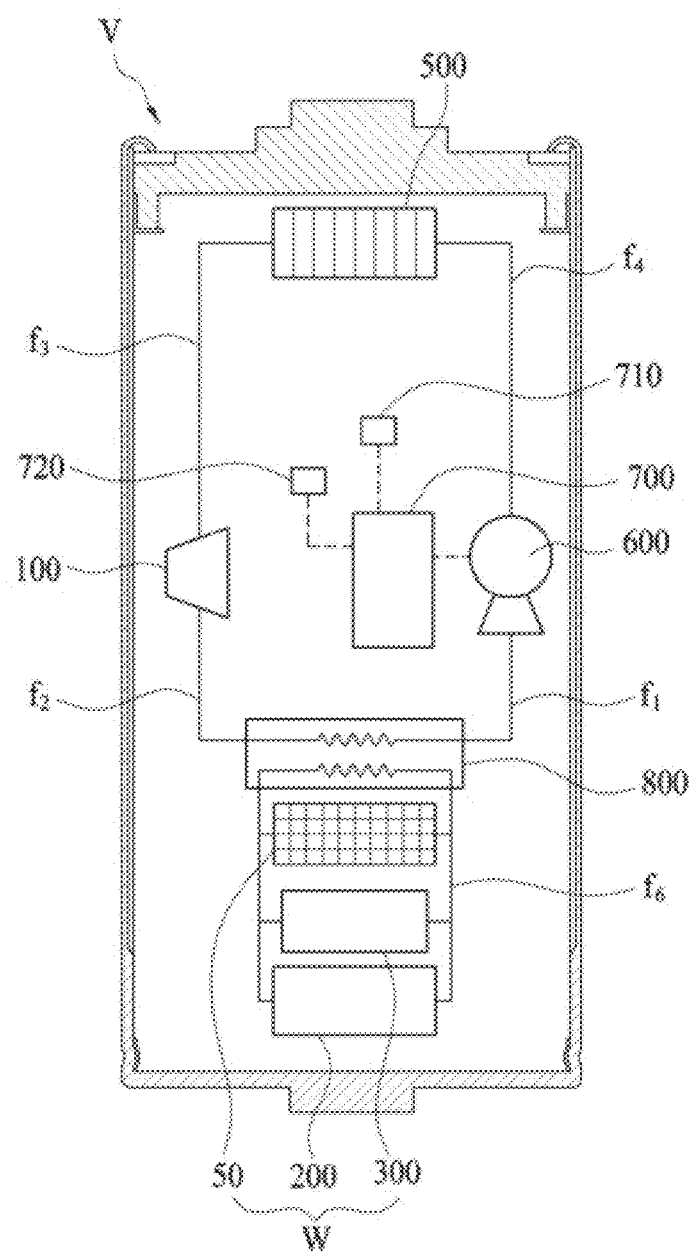
FIG. 2 is a diagram schematically illustrating the structure of an electric vehicle in accordance with another embodiment of the present disclosure.

FIG. 2 is a diagram schematically illustrating the structure of an electric vehicle V in accordance with another embodiment of the present disclosure.

The embodiment of the present disclosure shown in FIG. 2 generally includes the same components as the preceding embodiment, and a duplicated description of the same components will be omitted herein.

This embodiment further includes a heat exchange unit 800 that is provided on the path of the circulation system to be spaced apart from the heat source W and performs an indirect heat exchange process between heat generated from the heat source W and the working fluid.

In other words, according to this embodiment, the heat source W itself is not located on the path of the circulation system but the heat exchange unit 800 is provided on the path of the circulation system, so that the indirect heat exchange may be performed between the heat source W and the working fluid.

Here, the heat source W may independently have a heat exchange line f6 for forming the circulation path of the working fluid between the battery unit 200, the motor unit 300, the solar panel unit 50, and the heat exchange unit 800. Thus, the heat exchange unit 800 performs the heat exchange process between a main circulation system and the heat exchange line f6.

Although not shown in the drawings, an auxiliary pump for circulating the working fluid and an auxiliary flow distributor for determining and distributing the flow rate of the working fluid circulated to the battery unit 200, the motor unit 300, and the solar panel unit 50 may be provided on the path of the heat exchange line f6.

Meanwhile, in each of the embodiments shown in FIGS. 1 and 2, the radiator 500 may be replaced with a condenser (not shown). In other words, the electric vehicle V of the present disclosure may further include the condenser as well as the radiator 500. The condenser may perform the heat exchange process between the working fluid passing through the power generating unit 100 and the outside air, similarly to the radiator 500.

Figure 3:
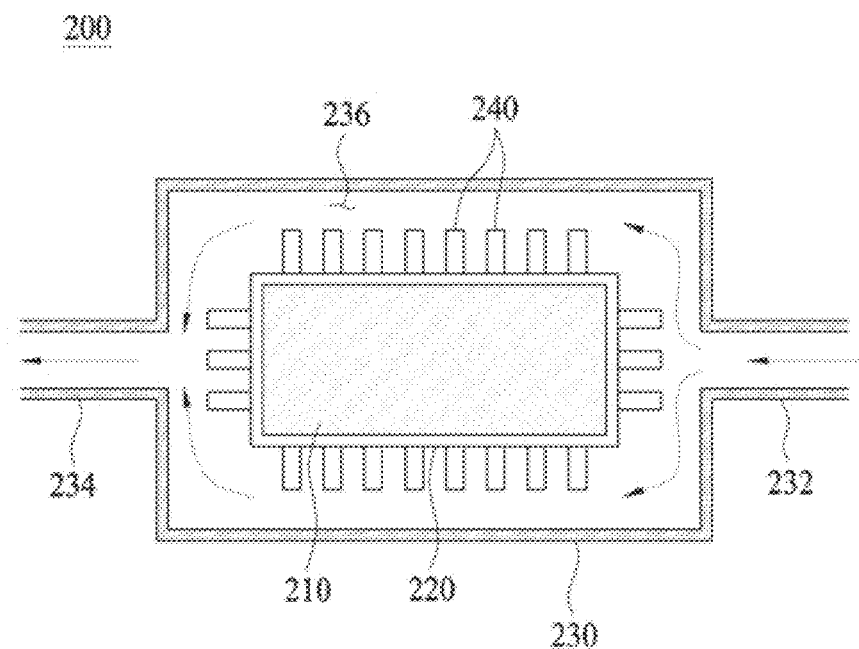
FIG. 3 is a diagram illustrating a battery unit applied to the electric vehicle in accordance with each embodiment of the present disclosure.

FIG. 3 is a diagram illustrating the battery unit 200 applied to the electric vehicle V in accordance with each embodiment of the present disclosure.

As shown in FIG. 3, the battery unit 200 applied to each embodiment may include a battery body 210, an inner housing 220 that surrounds the battery body 210, and an outer housing 230 that surrounds the inner housing 220, has on one side thereof a first inlet 232 into which the working fluid is introduced, has on the other side thereof a first outlet 234 from which the working fluid is discharged, and a first heat exchange path 236 defined between the inner housing 220 and the outer housing to allow the working fluid to flow therethrough.

The battery unit 200 may further include a radiation fin 240 that is exposed to the first heat exchange path 236. In this embodiment, a plurality of radiation fins 240 is provided on the circumferential surface of the inner housing 220. However, the mounting position and number of the radiation fin 240 may be changed in various ways without being limited to this embodiment.

The inner housing 220 and the radiation fin 240 may be formed of a material having high heat conductivity to effectively transmit heat generated from the battery body 210.

As such, the working fluid may perform an effective heat exchange process with the battery body 210 in the first heat exchange path 236.

Figure 4:
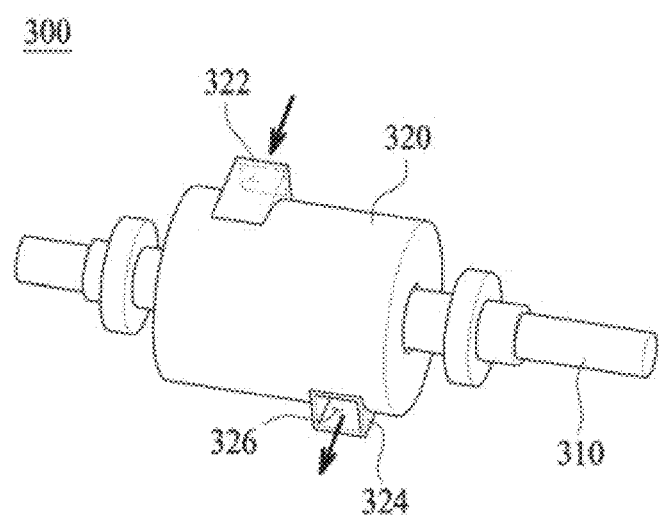
FIG. 4 is a diagram illustrating a motor unit applied to the electric vehicle in accordance with each embodiment of the present disclosure.

FIG. 4 is a diagram illustrating the motor unit 300 applied to the electric vehicle V in accordance with each embodiment of the present disclosure.

As shown in FIG. 4, the motor unit 300 applied to each embodiment basically includes a rotor and a stator (not shown). Since this is obvious to those skilled in the art, an additional description will be omitted.

The motor unit 300 includes a case 320 that is formed to surround the rotor and the stator, has on one side thereof a second inlet 322 into which the working fluid is introduced, has on the other side thereof a second outlet 324 from which the working fluid is discharged, and has a second heat exchange path 326 which causes the second inlet 322 and the second outlet 324 to communicate with each other.

The case 320 may be shaped such that a motor rotating shaft 310 connected to the rotor passes therethrough, and be formed such that the second heat exchange path 326 has various types of paths in the case 320. The second heat exchange path 326 may have a shape for effective heat exchange, for example, a spiral shape in which the path surrounds the case 320 n times.

The working fluid may perform an effective heat exchange process with heat generated between the rotor and the stator in the second heat exchange path 236.

Figure 5:
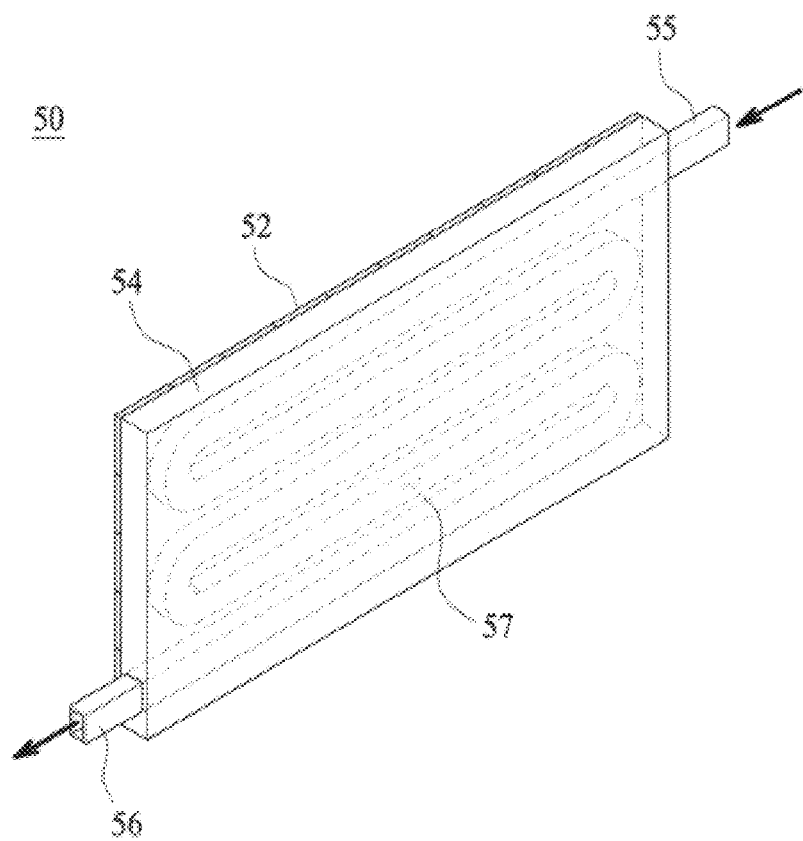
FIG. 5 is a diagram illustrating a solar panel unit applied to the electric vehicle in accordance with each embodiment of the present disclosure.

FIG. 5 is a diagram illustrating the solar panel unit 50 applied to the electric vehicle V in accordance with each embodiment of the present disclosure.

As shown in FIG. 5, the solar panel unit 50 applied to each embodiment is provided with a solar panel 52, and includes a cooling module that transfers the heat of the solar panel 52 to the working fluid, as the working fluid is circulated therein.

To be more specific, the cooling module includes a third inlet 55 into which the working fluid is introduced, a third outlet 56 from which the working fluid is discharged, and a third heat exchange path 57 which causes the third inlet 55 and the third outlet 56 to communicate with each other to circulate the working fluid, and a heat exchange plate 54 which is provided to come into contact with a surface of the solar panel 52.

Here, the heat exchange plate 54 may be formed of a material having high heat conductivity so as to effectively transmit heat generated from the solar panel 52.

The third heat exchange path 57 may be formed in the heat exchange plate 54 to have various shapes of paths. The third heat exchange path 57 may have a shape for effective heat exchange, for example, a shape in which the path is reciprocated n times in a coil shape in the heat exchange plate 54.

The working fluid may perform the effective heat exchange with the solar panel 52 in the solar panel unit 50.

Figure 6:
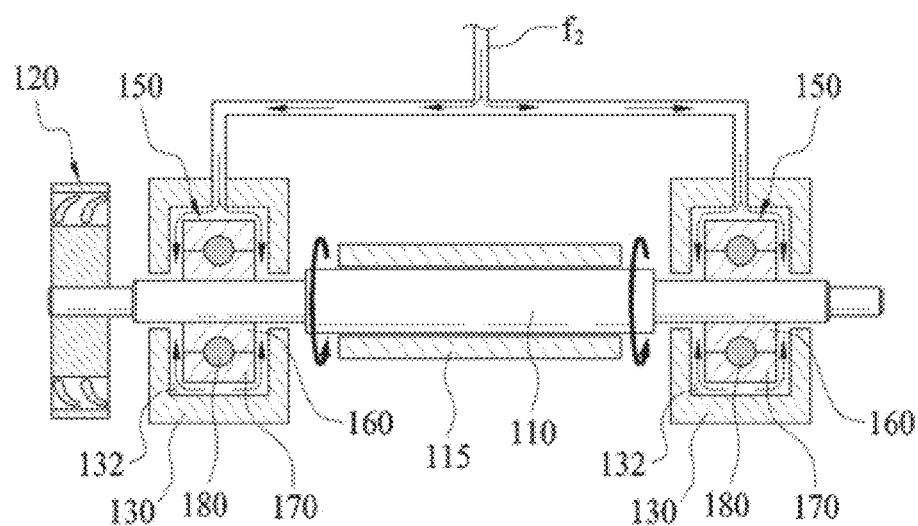
FIG. 6 is a diagram illustrating a power generating unit applied to the electric vehicle in accordance with each embodiment of the present disclosure.

FIG. 6 is a diagram illustrating the power generating unit 100 applied to the electric vehicle in accordance with each embodiment of the present disclosure.

As shown in FIG. 6, the power generating unit 100 applied to each embodiment of the present disclosure includes a turbine 120 that is rotated by the flow of the working fluid that is phase-changed to a gaseous state, and a rotating shaft 110 that is connected to the turbine 120 to be rotated by the rotation of the turbine 120. The power generating unit further includes a gas bearing 150, a cover module 130, and a rolling bearing 180.

To be more specific, the gas bearing 150 is formed to surround a part of the rotating shaft 110, and includes an inner race 160 that is rotated as the rotating shaft 110 is rotated, and an outer race 170 that is formed to surround the inner race 160.

The cover module 130 is formed to surround the gas bearing 150, and is formed to selectively move away from or come into contact with the gas bearing 150.

Figure 7:
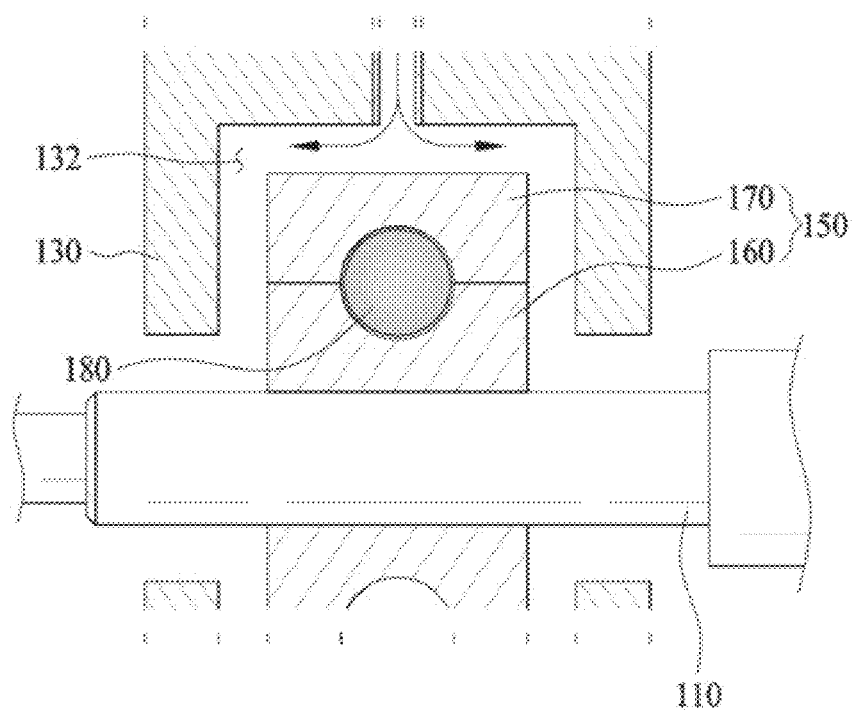
FIGS. 7 and 8 are diagrams illustrating the operation of the power generating unit applied to the electric vehicle in accordance with each embodiment of the present disclosure.

Particularly, when gas is supplied at a preset pressure level or more, the cover module 130 is spaced apart from the gas bearing 150 by a predetermined distance by the pressure of the gas as shown in FIG. 7, thus maintaining a state independent from the rotation of the gas bearing 150 and thereby reducing the rotational friction force of the rotating shaft 110.

The rolling bearing 180 is provided between the inner race 160 and the outer race 170, and is rotated between the inner race 160 and the outer race 170 to reduce friction force before the cover module 130 comes into contact with the rotating shaft 110.

Figure 8:
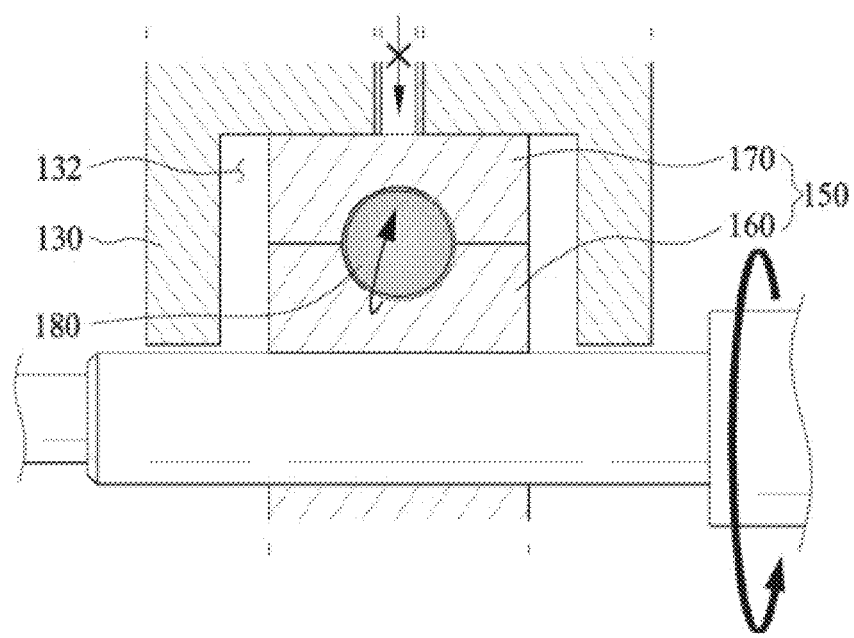

In unexpected situations, for example, when gas is supplied below a preset pressure level or gas is supplied abnormally, the cover module 130 is moved downwards by its weight to come into contact with the gas bearing 150 as shown in FIG. 8. In such a situation, the rolling bearing 180 may be rotated between the inner race 160 and the outer race 170 to reduce the friction force.

In other words, when there is a problem with the driving of the gas bearing 150, the rolling bearing 180 is driven instead of the gas bearing 150, thus reducing the rotational friction force of the rotating shaft 110.

The shape of the rolling bearing 180 is not limited as long as it may be rotated between the outer race 170 and the inner race 160 to reduce the friction force. For example, a ball bearing or the like may be used as the rolling bearing 180. In addition, various bearings may be applied.

Although the preferred embodiments of the present disclosure have been disclosed for illustrative purposes, those skilled in the art will appreciate that various modifications, additions and substitutions are possible, without departing from the scope and spirit of the disclosure. Therefore, the above-described embodiments are not restrictive but are illustrative. It is to be understood that the scope of the disclosure is determined by the appended claims, and all changes falling within bounds of the claims or equivalence of the bounds are included in the scope of the disclosure.

The invention claimed is:

1. An electric vehicle including a Rankine cycle in which a circulation system of working fluid is formed,
   wherein the Rankine cycle comprises:
   a pump configured to circulate the working fluid along the circulation system;
   a heat source comprising a battery unit, a motor unit, and a solar panel unit to transmit thermal energy to the working fluid circulated by the pump;

a power generating unit provided on a path of the circulation system to generate electric energy through the thermal energy of the working fluid passing through the heat source; and a radiator configured to perform a heat exchange process between the working fluid passing through the power generating unit and outside air, and wherein the Rankine cycle further comprises a flow distributor to distribute the working fluid circulated by the pump to at least one of the battery unit, the motor unit, and the solar panel unit, wherein the working fluid is phase-changed from liquid to gas while passing through the heat source, wherein the power generating unit comprises:
  a turbine rotated by flow of the working fluid that is phase-changed to the gaseous state;
  a rotating shaft connected to the turbine to be rotated by rotation of the turbine;
  a gas bearing formed to surround a part of the rotating shaft, and including an inner race rotated as the rotating shaft is rotated, and an outer race formed to surround the inner race;
  a cover module formed to surround the gas bearing, and selectively moving away from or coming into contact with the gas bearing; and
  a rolling bearing provided between the inner race and the outer race, and rotated between the inner race and the outer race to reduce friction force before the cover module comes into contact with the rotating shaft, wherein the cover module is spaced apart from the gas bearing by a predetermined distance as the working fluid is supplied at a preset pressure level or more, thus maintaining a state independent from rotation of the gas bearing.

2. The electric vehicle of claim 1, wherein the heat source is provided on a path of the circulation system to directly perform the heat exchange process with the working fluid.

3. The electric vehicle of claim 1, further comprising:
a controller configured to control driving of the Rankine cycle.

4. The electric vehicle of claim 3, further comprising:
an acceleration sensor configured to sense a speed of the vehicle,
wherein the controller controls a circulating flow rate of the working fluid to correspond to the speed of the vehicle determined by the acceleration sensor.

5. The electric vehicle of claim 4, further comprising:
a cooling fan configured to produce air having a predetermined speed and supply the air to the radiator, when it is determined by the acceleration sensor that the speed of the vehicle is less than a reference speed.

6. The electric vehicle of claim 3, further comprising:
a temperature sensor configured to sense temperature of heat transferred from the solar panel unit,
wherein the controller controls the circulating flow rate of the working fluid to correspond to the temperature of the heat transferred from the solar panel unit and determined by the temperature sensor.

7. The electric vehicle of claim 1, wherein the battery unit comprises:
a battery body;
an inner housing provided to surround the battery body; and
an outer housing provided to surround the inner housing, having on a first side thereof a first inlet into which the working fluid is introduced, and having on a second side thereof a first outlet from which the working fluid is discharged, with a first heat exchange path defined between the outer housing and the inner housing to allow the working fluid to flow therethrough.

8. The electric vehicle of claim 7, wherein the battery unit further comprises:
a radiation fin exposed to the first heat exchange path.

9. The electric vehicle of claim 1, wherein the motor unit comprises:
a rotor and a stator; and
a case formed to surround the rotor and the stator, having on a first side thereof a second inlet into which the working fluid is introduced, having on a second side thereof a second outlet from which the working fluid is discharged, and having a second heat exchange path to cause the second inlet and the second outlet to communicate with each other.

10. The electric vehicle of claim 1, wherein the solar panel unit comprises:
a solar panel configured to collect solar light; and
a cooling module including a third inlet into which the working fluid is introduced, a third outlet from which the working fluid is discharged, a third heat exchange path which causes the third inlet and the third outlet to communicate with each other to circulate the working fluid, and a heat exchange plate provided to come into contact with a surface of the solar panel.

11. The electric vehicle of claim 1, wherein the rolling bearing is rotated between the inner race and the outer race to reduce the friction force, when the cover module comes into contact with the gas bearing as the working fluid is supplied below the preset pressure level.

12. An electric vehicle including a Rankine cycle in which a circulation system of working fluid is formed,
wherein the Rankine cycle comprises:
  a pump configured to circulate the working fluid along the circulation system;
  a heat source comprising a battery unit, a motor unit, and a solar panel unit to transmit thermal energy to the working fluid circulated by the pump;
  a power generating unit provided on a path of the circulation system to generate electric energy through the thermal energy of the working fluid passing through the heat source; and
  a condenser configured to perform a heat exchange process between the working fluid passing through the power generating unit and outside air, and wherein the Rankine cycle further comprises a flow distributor to distribute the working fluid circulated by the pump to at least one of the battery unit, the motor unit, and the solar panel unit, wherein the working fluid is phase-changed from liquid to gas while passing through the heat source, wherein the power generating unit comprises:
  a turbine rotated by flow of the working fluid that is phase-changed to the gaseous state;
  a rotating shaft connected to the turbine to be rotated by rotation of the turbine;
  a gas bearing formed to surround a part of the rotating shaft, and including an inner race rotated as the rotating shaft is rotated, and an outer race formed to surround the inner race;
  a cover module formed to surround the gas bearing, and selectively moving away from or coming into contact with the gas bearing; and
  a rolling bearing provided between the inner race and the outer race, and rotated between the inner race and the outer race to reduce friction force before the cover module comes into contact with the rotating shaft, wherein the cover module is spaced apart from the gas bearing by a predetermined distance as the working fluid is supplied at a preset pressure level or more, thus maintaining a state independent from rotation of the gas bearing.

13. The electric vehicle of claim 12, wherein the heat source is provided on a path of the circulation system to directly perform the heat exchange process with the working fluid.

14. The electric vehicle of claim 12, further comprising:
a controller configured to control driving of the Rankine cycle.

* * * * *